(12) United States Patent
Shinohara et al.

(10) Patent No.: US 8,792,503 B2
(45) Date of Patent: Jul. 29, 2014

(54) PATH SELECTION METHOD, INFORMATION PROCESSOR, NETWORK SYSTEM, AND PATH SELECTION PROGRAM

(75) Inventors: Yusuke Shinohara, Tokyo (JP); Yasunobu Chiba, Tokyo (JP); Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 50 days.

(21) Appl. No.: 13/137,931

(22) Filed: Sep. 21, 2011

(65) Prior Publication Data

US 2012/0014388 A1 Jan. 19, 2012

(30) Foreign Application Priority Data

Mar. 17, 2010 (JP) ................. 2010-061118

(51) Int. Cl.
*H04L 12/56* (2006.01)
(52) U.S. Cl.
USPC ............ 370/400; 370/254; 370/352; 709/244
(58) Field of Classification Search
None
See application file for complete search history.

(56) References Cited

U.S. PATENT DOCUMENTS

| | | | |
|---|---|---|---|
| 7,496,680 B2 | 2/2009 | Canright | |
| 7,826,349 B2 * | 11/2010 | Kaur et al. | 370/229 |
| 8,214,707 B2 * | 7/2012 | Munson et al. | 714/748 |
| 2004/0146007 A1* | 7/2004 | Saadawi et al. | 370/238 |
| 2008/0275999 A1* | 11/2008 | Yanagihara | 709/232 |
| 2012/0005251 A1* | 1/2012 | Xie et al. | 709/201 |

FOREIGN PATENT DOCUMENTS

| | | |
|---|---|---|
| JP | 11-27321 A | 1/1999 |
| JP | 2000-115255 A | 4/2000 |
| JP | 2002-64538 A | 2/2002 |
| JP | 2006-506843 A | 2/2006 |

OTHER PUBLICATIONS

International Search Report (ISR) (PCT Form PCT/ISA/210) dated Mar. 22, 2011, with partial English translation.
Edsger W. Dijkstra, "A Note on Two Problems in Connexion with Graphs" Numerische Mathematik, vol. 1, pp. 269-271 (1959).
David Eppstein, "Finding the k Shortest Path", Mar. 31, 1997.
Y. Honma, M. Aida, H. Shimonishi and A. Iwata, "A New Multi-path Routing Methodology Based on Logit Type Assignment", In FutureNet II, 2009, p. 13-18.
Nick McKeown et al., "OpenFlow: enabling innovation in campus networks," ACM SIGCOMM Computer Communication Review, vol. 38, issue 2, pp. 69-74, Apr. 2008.
Iwata, et al., "Proposal of probabilistic routing algorithm adapting to MANET and estimation using VoIP", MANET, VoIP, vol. 2008 No. 18, Feb. 27, 2008, p. 223-230.

* cited by examiner

*Primary Examiner* — Donald Mills
(74) *Attorney, Agent, or Firm* — McGinn IP Law Group, PLLC (57) ABSTRACT

A path selection method, an information processor, a network system, and a path selection program are provided which rapidly determine a path that has no loop when determining the path by using a control server to probabilistically select a pass node. A network having a plurality of paths from a source to a destination is controlled. A node forming the path is selected on the basis of a node-to-node transfer probability, and in the case where the selected node is a node that has already been passed through on the path, the transfer probability is reset such that the selection of the node is suppressed.

12 Claims, 6 Drawing Sheets

<TRANSFER PROBABILITY TABLE 400-i FOR TARGET NODE 5-i>

| TRANSFER DESTINATION NODE | NEXT HOP NODE | SELECTION PROBABILITY |
|---|---|---|
| 5-1 | 5-i1(1) | Pi1(1) |
|  | 5-i1(2) | Pi1(2) |
| ⋮ | ⋮ | ⋮ |
| 5-j (j=1~n≠i) | 5-ij(1) | Pij(1) |
|  | ⋮ | ⋮ |
|  | 5-ij(k) | Pij(k) |
|  | ⋮ | ⋮ |
|  | 5-ij(m) | Pij(n) |
| ⋮ | ⋮ | ⋮ |
| 5-n |  |  |

PATH SELECTION METHOD, INFORMATION PROCESSOR, NETWORK SYSTEM, AND PATH SELECTION PROGRAM

TECHNICAL FIELD

The present invention relates to a path selection method, an information processor, a network system, and a path selection program. More particularly, the present invention relates to a path selection method, an information processor, a network system, and a path selection program which transfer a flow by nodes located on a network to implement a communication.

BACKGROUND ART

A communication network system is known in which a communication network including a plurality of nodes is centrally managed by a management server. When the management server receives a path setting request for a certain flow, it determines a communication path of the flow on the communication network. Hereinafter, the management server which determines a communication path of a flow as described above will also be referred to as a "control server".

As an algorithm for acquiring the shortest path from a source node to a destination node, the Dijkstra's Algorithm is described in NPL 1. When a communication of a plurality of flows is to be established between a source node and a destination node, however, simply using the Dijkstra's Algorithm will cause the same communication path (the shortest path) to be set for the plurality of flows. This increases the load on that communication path, leading to a reduction in communication efficiency.

In order to distribute the load, different communication paths may be suitably set for different flows between the same source node and the same destination node. To this end, it is conceivable to extract not only the shortest path but also other communication paths between the source node and the destination node. As the techniques for acquiring a plurality of communication paths from a source node to a destination node, the following techniques are known.

NPL 2 describes a k-shortest path method, according to which k shortest paths are extracted by the Dijkstra's Algorithm to assign a path of a packet or a flow at random to one of the k shortest paths. This method allows a plurality of paths to be acquired from a source node to a destination node.

In the case of using the k-shortest path method, however, the Dijkstra's Algorithm is used to acquire the communication paths, requiring a huge amount of calculation.

NPL 3 describes a method for acquiring a path from a source node to a destination node while distributing the load and reducing the amount of calculation. According to the method described in NPL 3, a node on a path generates a transfer probability table for a certain destination and uses the transfer probability table to transfer a packet on the basis of the probability. In this case, the transfer probability table has, for a destination node, neighboring switches and transfer probabilities thereto. When an address of the destination node is determined, a packet is probabilistically transferred to a neighboring node.

With the method described in NPL 3, a transfer probability table can readily be built, permitting a reduction in amount of calculation.

While the method described in NPL 3 is for probabilistic packet transfer, this method is applicable to flow transfer as well.

As a method for setting different communication paths for different flows between the same source node and the same destination node, a technique called "OpenFlow" is proposed in NPL 4. According to the "OpenFlow" technique, a communication is regarded as an end-to-end flow, and a path control, a recovery, load distribution, and optimization are performed in units of flows. An OpenFlow switch, which functions as a transfer node, is provided with a secure channel for communication with an OpenFlow controller, and operates in accordance with a flow table which is added or rewritten as appropriate in accordance with an instruction from the OpenFlow controller. The flow table defines, for each flow, a combination of a rule to be checked with a packet header, an action defining the process content, and flow statistical information.

For example, when an OpenFlow switch receives a first packet, it searches a flow table for an entry having a rule (FlowKey) that matches the header information of the received packet. When the search finds an entry that matches the received packet, the OpenFlow switch processes the received packet in accordance with the process content described in the action field of the entry. On the other hand, when the search finds no entry that matches the received packet, the OpenFlow switch transfers the received packet to an OpenFlow controller, via a secure channel, to request the controller to determine a path of the packet on the basis of the source and destination of the received packet. The OpenFlow switch then receives from the controller a flow entry that implements the same, and updates the flow table.

In the method in which a transfer probability table is used to transfer a flow in a probabilistic manner, the next hop is selected probabilistically. This may cause a routing loop to occur, leading to a reduction in communication efficiency.

PTL 1 describes, in a method for probabilistically transferring a flow using a transfer probability table, a method for working around a routing loop in the event that the loop occurs.

According to the method described in PTL 1, a node is selected at random from among next hop node candidates, a target node is updated to the selected next hop node, and it is checked whether the target node is a node that has already been passed through. If the target node is the one that has already been passed through, it is determined that a loop has occurred, and the path falls back to the state before the occurrence of the loop. That is, according to this method, every time an occurrence of a loop is detected, selection of the next hop node is performed again.

With the method described in PTL 1, a path may be determined without causing a routing loop. Under a circumstance where routing loops would occur frequently, however, it is highly likely that a target node is a node that has already been passed through and, hence, the fall back of path would likely be repeated a large number of times. As a result, with the method described in PTL 1, the amount of calculation for path computation will be increased, so that the path computation cannot be performed rapidly.

CITATION LIST

Patent Literature

PTL 1: Japanese Patent Application Laid-Open No. 2000-115255

Non Patent Literature

NPL 1: Edsger W. Dijkstra, "A Note on Two Problems in Connexion with Graphs" Numerische Mathematik, vol. 1, pp. 269-271 (1959)

NPL 2: David Eppstein, "Finding the k Shortest Path", March, 1997

NPL 3: Y. Honma, M. Aida, H. Shimonishi and A. Iwata, A New Multi-path Routing Methodology Based on Logit Type Assignment, In FutureNet II, 2009, p. 13-18

NPL 4: Nick McKeown et al., "OpenFlow: enabling innovation in campus networks," ACM SIGCOMM Computer Communication Review, vol. 38, issue 2, pp. 69-74, April 2008

SUMMARY OF INVENTION

Technical Problem

To prevent a reduction in communication efficiency, it is necessary to rapidly determine a path including no routing loop.

With the above-described techniques, however, under a circumstance where routing loops will occur frequently, since the amount of calculation performed in a control server for determining a communication path will become enormous, it is difficult to determine a loopless path rapidly.

An exemplary object of the present invention is to rapidly determine a path that has no loop when determining the path by using a control server to probabilistically select a pass node.

Solution to Problem

A path selection method according to the present invention is a path selection method controlling a network having a plurality of paths from a source to a destination, the method including the steps of: selecting a node forming the path, on the basis of a node-to-node transfer probability; and in the case where the selected node is a node that has already been passed through on the path, resetting the transfer probability such that the selection of the node is suppressed.

An information processor according to the present invention is an information processor controlling a network system having a plurality of paths from a source to a destination, the information processor including: means for selecting a node forming the path, on the basis of a node-to-node transfer probability; and means, in the case where the selected node is a node that has already been passed through on the path, for resetting the transfer probability such that the selection of the node is suppressed.

A network system according to the present invention is a network system having a plurality of paths from a source to a destination, the network system including a control server configured to set a prescribed path from among the plurality of paths, the control server including: means for selecting a node forming the path, on the basis of a node-to-node transfer probability; and means, in the case where the selected node is a node that has already been passed through on the path, for resetting the transfer probability such that the selection of the node is suppressed.

A path selection program according to the present invention is performed by a computer in a network system, the network system having a plurality of paths from a source to a destination, the computer being configured to set a prescribed path from among the plurality of paths, the program causing the computer to execute the steps of: selecting a node forming the path, on the basis of a node-to-node transfer probability; and in the case where the selected node is a node that has already been passed through on the path, resetting the transfer probability such that the selection of the node is suppressed.

Advantageous Effects of Invention

According to the present invention, in the method in which a transfer probability table is used to transfer a flow probabilistically, the transfer probability is reset rapidly so as to suppress the selection of the node that would form a routing loop. This significantly reduces the possibility that the fall back of path is repeated a large number of times accompanying the selection of the nodes that would form loops. Accordingly, the communication efficiency is improved, and the path can be set rapidly.

BRIEF DESCRIPTION OF DRAWINGS

[FIG. 1]

[FIG. 2]

[FIG. 3]

[FIG. 4]

[FIG. 5]

[FIG. 6]

[FIG. 7]

DESCRIPTION OF EMBODIMENT

An exemplary embodiment of the present invention will now be described with reference to the accompanying drawings.

1. Communication Network System

Figure 1:
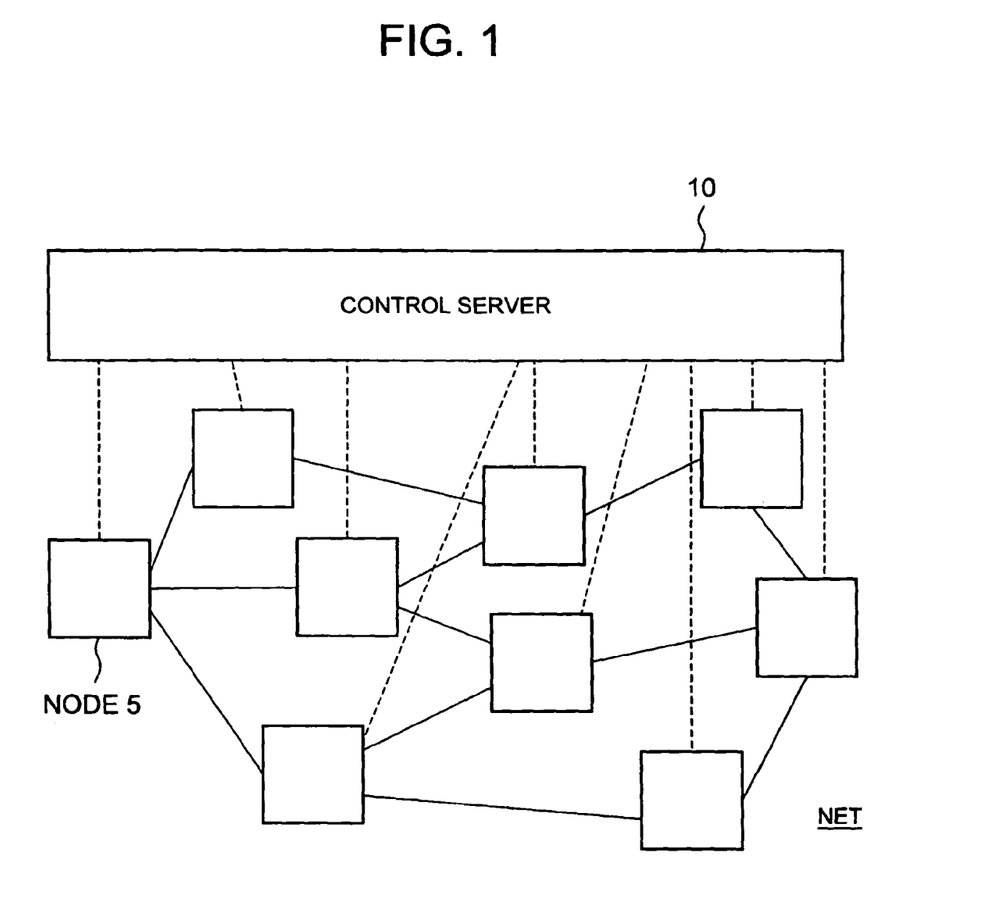
FIG. 1 is a schematic diagram illustrating a communication network system according to an exemplary embodiment of the present invention.

FIG. 1 schematically shows a communication network system 1 according to an exemplary embodiment of the present invention. The communication network system 1 includes a communication network (NET) including a plurality of nodes 5. In the present exemplary embodiment, it is assumed that the communication network (NET) includes n nodes 5-1 to 5-n (where n is an integer equal to or greater than 2).

When a communication path is determined, a control server 10 instructs each node 5 on the determined communication path to transfer data (a packet or a frame) of the flow through the determined communication path. Each node 5 sets itself in accordance with the instruction.

For example, a "transfer table" is provided in each node 5. The transfer table is a table that indicates a correspondence between a source and a destination of a flow or packet data. Each node 5 is able to transfer a flow or packet data received from a source to a designated destination by referring to the transfer table. In this case, the control server 10 instructs each node 5 to set the transfer table so that the flow or the packet data is transferred through the determined communication path. Each node 5 sets the content of its transfer table in accordance with the instruction from the control server 10.

2. Overview of Path Setting Process

Figure 2:
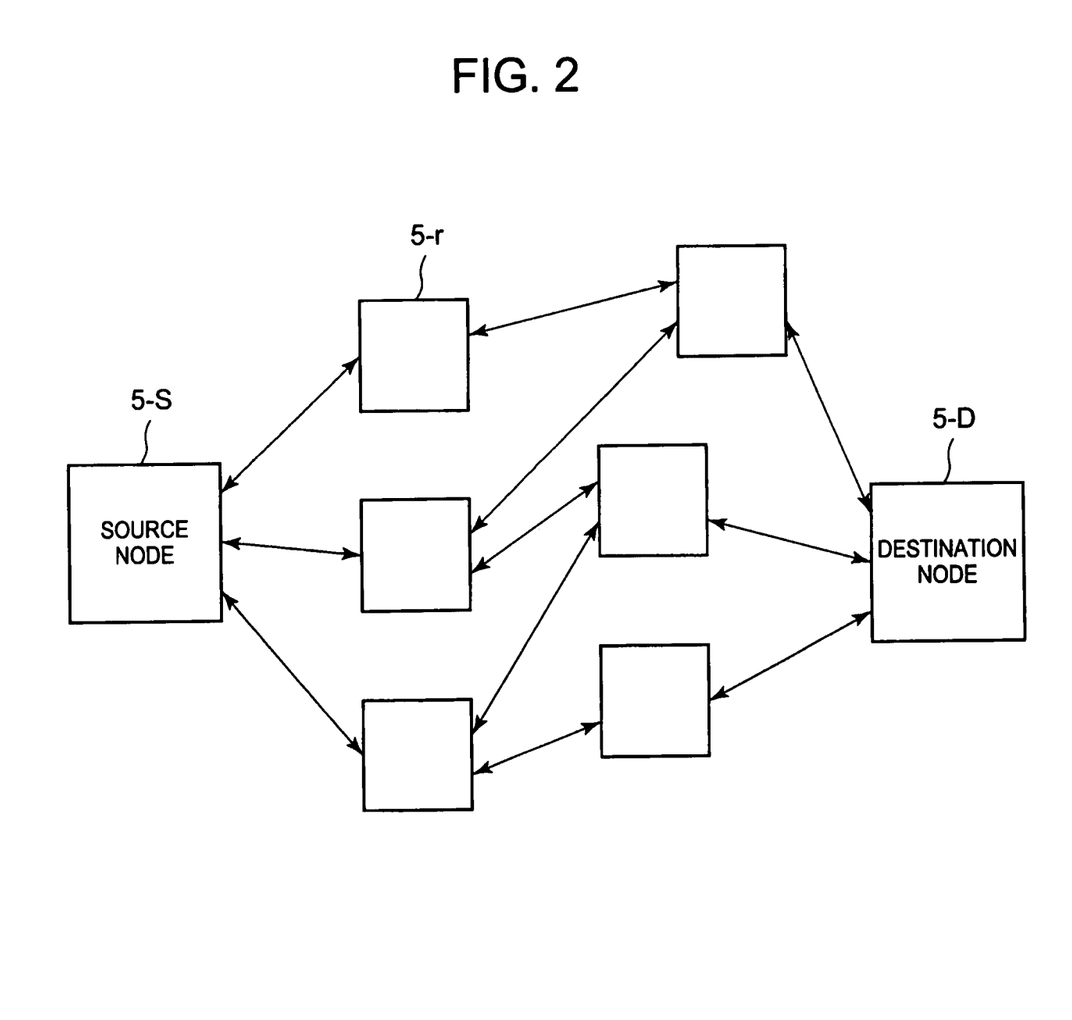
FIG. 2 is a conceptual diagram illustrating communication paths from a source node to a destination node.

FIG. 2 is a conceptual diagram illustrating a plurality of communication paths from a source node 5-S to a destination node 5-D. As shown in FIG. 2, in many cases, there are a plurality of communication paths from a source node 5-S to a destination node 5-D. Each communication path includes an arbitrary number of relay nodes 5-r, and different communication paths are made up of different combinations of relay nodes 5-r.

3. Transfer Probability Table

A transfer probability table 400 may be configured on the basis of network information from the communication network. In order to illustrate the transfer probability table 400, a "target node" and a "next hop node" will be described with reference to FIG. 3. A target node 5-i is one of the nodes 5-1 to 5-n (where i=1 to n). A destination node 5-j is one of the nodes 5-1 to 5-n that is different from the target node 5-i (where j=1 to n; j≠i). Now suppose that flow data is to be transmitted from the target node 5-i to the destination node 5-j. At this time, a next node to which the flow data is to be transferred from the target node 5-i is a "next hop node 5-ij". That is, the next hop node 5-ij is a node as a next hop from the target node 5-i that the flow data passes through. There may be a plurality of candidates for the next hop node 5-ij in correspondence with a given target node 5-i. In the case where there are m candidates (m is a natural number), these candidates are represented as 5-ij(1) to 5-ij(m). When generalized, a target node 5-i has a next hop node candidate 5-ij(k) (where k=1 to m). It is noted that the next hop node candidate 5-ij(k) may be one which moves away from the destination node 5-j.

Figure 3:
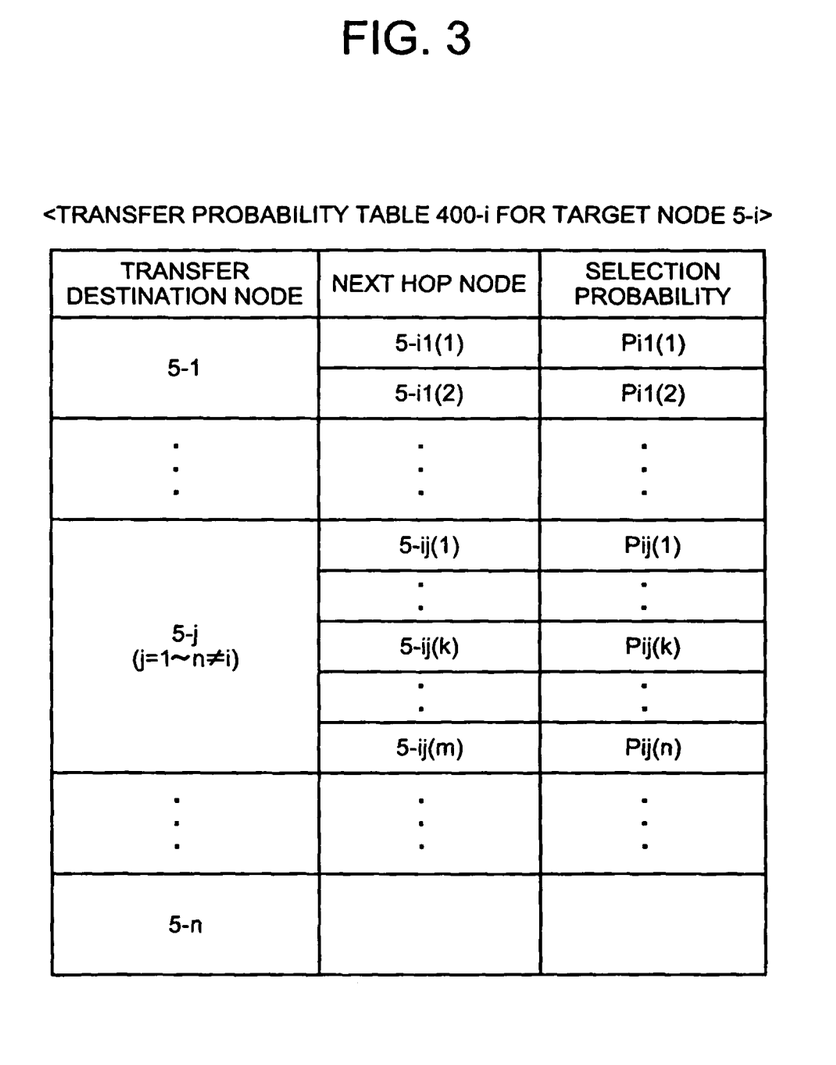
FIG. 3 is a conceptual diagram illustrating a transfer probability table.

The transfer probability table 400 provides "next hop information" which indicates the next hop node candidates described above. More specifically, transfer probability tables 400-1 to 400-n are provided for nodes 5-1 to 5-n, respectively. That is, a target node 5-i and a transfer probability table 400-i are associated with each other. The transfer probability table 400-i shows a next hop node candidate 5-ij(k) in correspondence with the target node 5-i.

FIG. 3 illustrates an example of the transfer probability table 400-i for the target node 5-i. As shown in FIG. 3, the transfer probability table 400-i shows a next hop node candidate 5-ij(k) for each destination node 5-j (where j=1 to n; j≠i). The transfer probability table 400-i also shows a "selection probability Pij(k)" which is defined for each next hop node candidate 5-ij(k). The selection probability Pij(k) is a probability that the next hop node 5-ij(k) is selected from among the m next hop node candidates 5-ij(1) to 5-ij(m).

The control server 10 according to the present exemplary embodiment causes a flow or a packet to be transferred probabilistically on the basis of the transfer probability table 400. At this time, a routing loop is able to be avoided efficiently, thereby permitting determination of a path that will not cause a reduction in communication efficiency.

It is noted that the above-described path setting process may be implemented as the control server 10 executes a path setting program. The path setting program, which is a computer program executed by the control server 10, may be recorded on a computer-readable recording medium.

4. Example of Control Server

Figure 4:
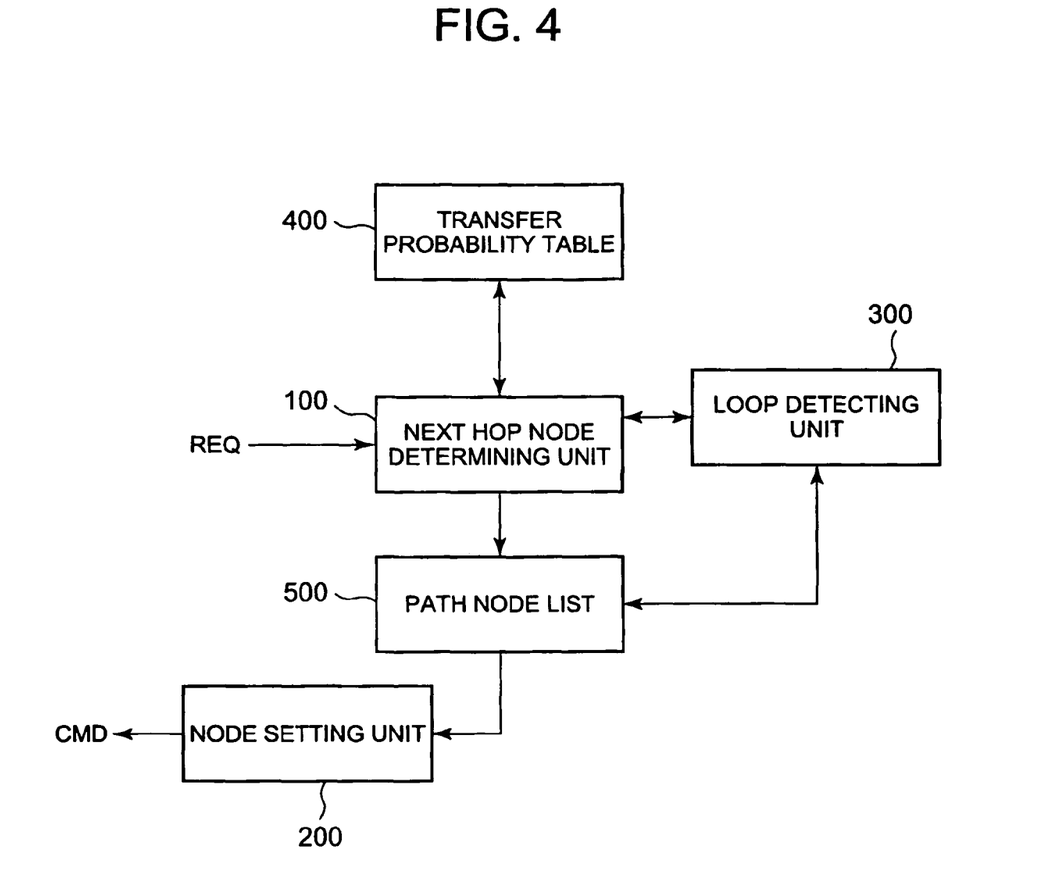
FIG. 4 is a block diagram illustrating the configuration of a control server according to the exemplary embodiment of the present invention.

FIG. 4 is a block diagram illustrating the configuration of the control server 10 according to the exemplary embodiment. The control server 10 includes a next hop node determining unit 100, a node setting unit 200, a loop detecting unit 300, a transfer probability table 400, and a path node list 500.

The next hop node determining unit 100 acquires, from the transfer probability table 400, candidates for a next hop node from a target node and transfer probabilities thereto, selects a node at random from among the next hop node candidates, updates the target node to the selected next hop node, and additionally writes it into the path node list 500.

Figure 5:
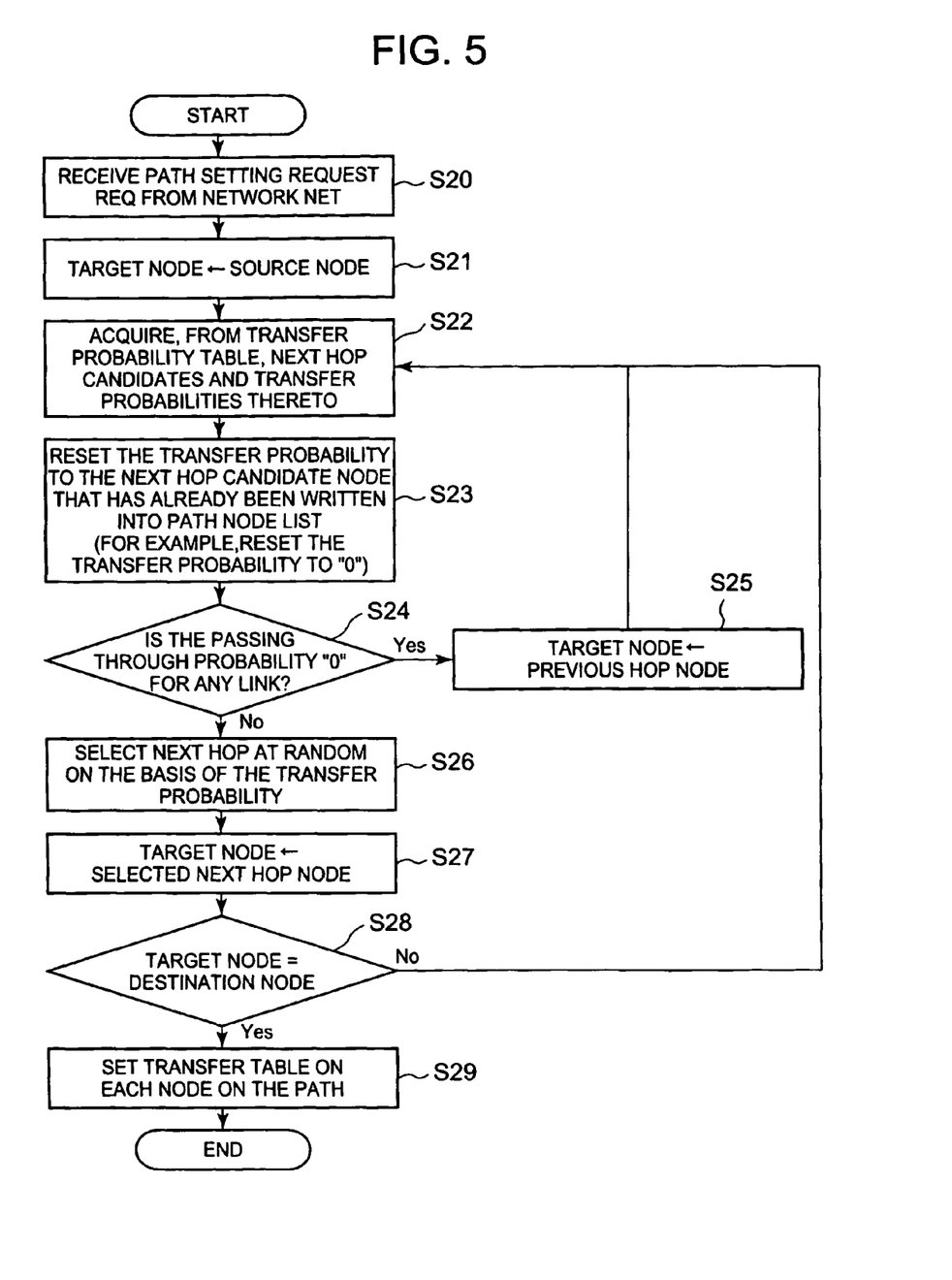
FIG. 5 is a flowchart illustrating a path setting method according to the exemplary embodiment.

FIG. 5 is a flowchart illustrating a path setting process according to the present exemplary embodiment. Hereinafter, the path setting process according to the present exemplary embodiment will be described in detail.

Step S20:

In the case where a flow occurs, the next hop node determining unit 100 receives a path setting request REQ for the flow from the communication network (NET). The path setting request REQ indicates a source node 5-S and a destination node 5-D for the flow.

Step S21:

The next hop node determining unit 100, on receipt of the path setting request REQ, recognizes the source node 5-S and the destination node 5-D. The next hop node determining unit 100 then initializes the target node 5-i to the source node 5-S.

Step S22:

The next hop node determining unit 100 acquires next hop candidates and transfer probabilities thereto from a transfer probability table 400 that is associated with the target node 5-i.

Step S23:

The loop detecting unit 300 resets the transfer probability to any node, among the next hop candidates acquired in step S22, that has already been written into the path node list 500 (i.e. the node that has already been passed through) to a value that is smaller compared to the transfer probability to a node, among the next hop candidates, that has not been written into the path node list 500, so as to prevent the node that has already been passed through from being selected as a next hop node. It is noted that the way of suppressing the selection of an already-passed through node as a next hop node is not restricted to decreasing the transfer probability to the already-passed through node. Of the next hop candidates, any node that has already been written into the path node list 500 will form a loop on a flow transmission path. By resetting the transfer probability to the node as described above, when a next hop is determined later on the basis of the transfer probabilities, selection of the node that will form a loop is suppressed. This eliminates the need to perform, for example, the path fall back process on a loop path, so that the amount of calculation is kept small even under the circumstance where routing loops would occur frequently, thereby permitting rapid path setting. While the case of resetting the transfer probability to a node that has already been written into the path node list 500 to a smaller value has been described above, the present invention is not restricted thereto. All that is needed is that the transfer probability to a node that has already been written into the path node list 500 is reset so as to suppress the determination of that node as a next hop. For example, setting the transfer probability to the node that has already been written into the path node list 500 to "0", and performing a process that causes the node to be excluded from the next hop candidates are included in the present invention.

Step S24:

The process performed in step S23 may produce a state where transfers to all the next hop candidates are suppressed. This includes, for example, the state where the transfer probabilities to all the next hop candidates are less than a prescribed threshold value, the state where the transfer probabilities to all the next hop candidates have been set to "0", and the state where all the next hop candidates have been excluded from the transfer target as a next hop. Therefore, in step S24, it is determined whether transfers to all the next hop candidates are suppressed. Hereinbelow, in the flowchart in FIG. 5, it is assumed that the transfer probability to a node that has already been written into the path node list 500 is reset to "0". Thus, it is determined, as a result of the process in step S23 where the transfer probability to the node that has already been written into the path node list 500 is reset to "0", whether the transfer probabilities to all the next hop candidate nodes have been set to "0".

Step S25:

As a result of the process in step S23 where the transfer probability to the node that has already been written into the path node list 500 is reset to "0", if the transfer probabilities to all the next hop candidate nodes have been set to "0" ("Yes" in step S24), the previous hop node is set to the target node 5-$i$ to perform step S22 again.

Step S26:

As a result of the process in step S23 where the transfer probability to the node that has already been written into the path node list 500 is reset to "0", if not all the transfer probabilities to the next hop candidate nodes have been set to "0" ("No" in step S24), the next hop node determining unit 100 acquires the next hop candidates and the transfer probabilities thereto from the transfer probability table, and selects a next hop node 5-$ij$ at random from among the next hop node candidates 5-$ij(1)$ to 5-$ij(m)$. For example, the next hop node determining unit 100 uses a random number and the selection probability Pij(k). It is noted that the total value of the transfer probabilities does not necessarily have to be 1.0.

As an example, suppose that m=3 and that the selection probabilities Pij(1) to Pij(3) for the next hop node candidates 5-$ij(1)$ to 5-$ij(3)$ are 0.2, 0.3, and 0.6, respectively. At this time, numeric ranges are defined for the next hop node candidates 5-$ij(1)$ to 5-$ij(3)$ in correspondence with their respective selection probabilities Pij(1) to Pij(3). For example, the next hop node determining unit 100 associates a range of not less than 0.0 and less than 0.2 with the next hop node candidate 5-$ij(1)$, a range of not less than 0.2 and less than 0.5 with the next hop node candidate 5-$ij(2)$, and a range of not less than 0.5 and less than 1.1 with the next hop node candidate 5-$ij(3)$. Then, the next hop node determining unit 100 generates a random number X within the range of not less than 0.0 and less than the total value of the transfer probabilities, because the total value of the transfer probabilities is not necessarily 1.0. Further, the next hop node determining unit 100 selects a next hop node candidate that is associated with the numeric range within which the generated random number X falls. For example, in the case where the random number X is 0.3, the next hop node determining unit 100 selects the next hop node candidate 5-$ij(2)$. In this manner, a next hop node 5-$ij$ can be selected at random and in accordance with the above-descried selection probability Pij(k).

Step S27:

When the next hop node 5-$ij$ is selected, the next hop node determining unit 100 registers the selected next hop node 5-$ij$ as a relay node 5-$r$ in the path node list 500. Further, the next hop node determining unit 100 updates the target node 5-$i$ to the selected next hop node 5-$ij$.

Step S28:

When the next hop determining process is completed, the next hop node determining unit 100 determines whether the updated target node 5-$i$ (i.e. the selected next hop node) coincides with the destination node 5-D. That is, the next hop node determining unit 100 determines whether the target node 5-$i$ has reached the destination node 5-D.

If the target node 5-$i$ has not reached the destination node 5-D yet ("No" in step S28), the process returns to step S22, and the next hop node determining unit 100 performs the next hop determining process on a new target node 5-$i$.

The above-described process is repeated, so that the next hop node determining unit 100 determines a relay node 5-$r$ at random one hop by one hop from the source node 5-S toward the destination node 5-D. Finally, the target node 5-$i$ reaches the destination node 5-D ("Yes" in step S28). That is, a communication path from the source node 5-S to the destination node 5-D is determined. In this manner, the next hop node determining unit 100 according to the present exemplary embodiment repeats the next hop determining process to determine a communication path at random one hop by one hop from the source node 5-S to the destination node 5-D.

Step S29:

Once the communication path has been determined, the node setting unit 200 instructs each node 5 on the determined communication path to transfer a flow or packet data through the determined communication path. More specifically, the node setting unit 200 sends a transfer table setting command CMD to each node 5 registered in the path node list 500. The transfer table setting command CMD is a command which instructs setting a transfer table such that a flow or packet data is transferred through the determined communication path.

Each node 5 on the determined communication path receives the transfer table setting command CMD from the control server 10 to set the content of the own transfer table in accordance with the command. This permits the data of the flow to be transmitted from the source node 5-S to the destination node 5-D.

While the present exemplary embodiment has been implemented as a path setting method in which a loop is eliminated by centralized control, it may be implemented as a path setting method in which a loop is eliminated by distributed control.

Figure 6:
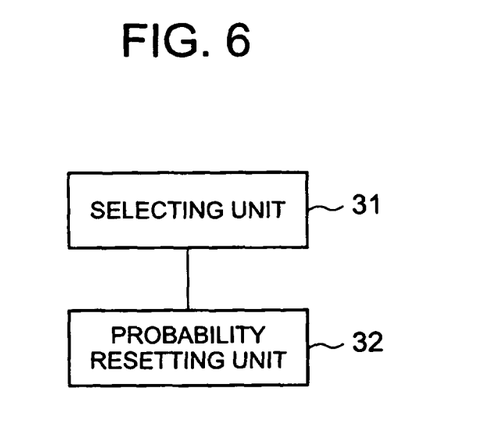
FIG. 6 is a block diagram illustrating an example of the main part of an information processor according to the present invention.

Hereinafter, the main part of the present invention will be described. FIG. 6 is a block diagram illustrating an example of the main part of an information processor according to the present invention. The information processor of the present invention controls a network system having a plurality of paths from a source to a destination. The information processor of the present invention includes a selecting unit 31 and a probability resetting unit 32.

The selecting unit 31 (for example, the next hop node determining unit 100) selects a node forming a path, on the basis of a node-to-node transfer probability.

In the case where the selected node is a node that has already been passed through on the path, the probability resetting unit 32 (for example, the loop detecting unit 300) resets the transfer probability so as to suppress the selection of that node.

Figure 7:
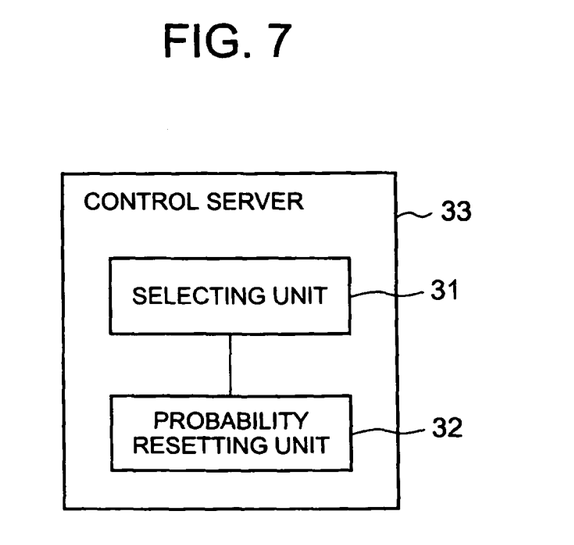
FIG. 7 is a block diagram illustrating an example of the main part of a network system according to the present invention.

FIG. 7 is a block diagram illustrating an example of the main part of a network system according to the present invention. The network system of the present invention is a network system having a plurality of paths from a source to a destination, and includes a control server 33 which sets a prescribed path from among the plurality of paths. The control server 33 includes a selecting unit 31 and a probability resetting unit 32. The selecting unit 31 and the probability resetting unit 32 are identical in terms of their operations to those illustrated in FIG. 6.

The above-described exemplary embodiment, in part or in whole, may be described as in the following appendices, although the same is not restricted thereto.

(Supplementary note 1) A path selection method controlling a network having a plurality of paths from a source to a destination, the method including the steps of: selecting a node forming the path, on the basis of a node-to-node transfer probability; and in the case where the selected node is a node that has already been passed through on the path, resetting the transfer probability such that the selection of the node is suppressed.

(Supplementary note 2) The path selection method according to Supplementary note 1, wherein in the case where the selected node is a node that has already been passed through on the path, the transfer probability to the node is reset to a value that is smaller compared to the transfer probability in the case where the node is not passed through.

(Supplementary note 3) The path selection method according to Supplementary note 1, wherein a random number X is generated within a range of not less than 0.0 and less than a total value of the transfer probabilities to select a next hop node probabilistically.

(Supplementary note 4) An information processor controlling a network system having a plurality of paths from a source to a destination, the information processor including: means for selecting a node forming the path, on the basis of a node-to-node transfer probability; and means, in the case where the selected node is a node that has already been passed through on the path, for resetting the transfer probability such that the selection of the node is suppressed.

(Supplementary note 5) The information processor according to Supplementary note 4, including means, in the case where the selected node is a node that has already been passed through on the path, for resetting the transfer probability to the node to a value that is smaller compared to the transfer probability in the case where the node is not passed through.

(Supplementary note 6) The information processor according to Supplementary note 4, including means for generating a random number X within a range of not less than 0.0 and less than a total value of the transfer probabilities to select a next hop node probabilistically.

(Supplementary note 7) A network system having a plurality of paths from a source to a destination, the network system including a control server configured to set a prescribed path from among the plurality of paths, the control server including: means for selecting a node forming the path, on the basis of a node-to-node transfer probability; and means, in the case where the selected node is a node that has already been passed through on the path, for resetting the transfer probability such that the selection of the node is suppressed.

(Supplementary note 8) The network system according to Supplementary note 7, including means, in the case where the selected node is a node that has already been passed through on the path, for resetting the transfer probability to the node to a value that is smaller compared to the transfer probability in the case where the node is not passed through.

(Supplementary note 9) The network system according to Supplementary note 7, including means for generating a random number X within a range of not less than 0.0 and less than a total value of the transfer probabilities to select a next hop node probabilistically.

(Supplementary note 10) A path selection program performed by a computer in a network system, the network system having a plurality of paths from a source to a destination, the computer being configured to set a prescribed path from among the plurality of paths, the program causing the computer to execute the steps of: selecting a node forming the path, on the basis of a node-to-node transfer probability; and in the case where the selected node is a node that has already been passed through on the path, resetting the transfer probability such that the selection of the node is suppressed.

(Supplementary note 11) An information processor controlling a network system having a plurality of paths from a source to a destination, the information processor including: a selecting unit which selects a node forming the path, on the basis of a node-to-node transfer probability; and a probability resetting unit which, in the case where the selected node is a node that has already been passed through on the path, resets the transfer probability such that the selection of the node is suppressed.

(Supplementary note 12) The information processor according to Supplementary note 11, including a probability resetting unit which, in the case where the selected node is a node that has already been passed through on the path, resets the transfer probability to the node to a value that is smaller compared to the transfer probability in the case where the node is not passed through.

(Supplementary note 13) The information processor according to Supplementary note 11, including a selecting unit which generates a random number X within a range of not less than 0.0 and less than a total value of the transfer probabilities to select a next hop node probabilistically.

(Supplementary note 14) A network system having a plurality of paths from a source to a destination, the network system including a control server configured to set a prescribed path from among the plurality of paths, the control server including: a selecting unit which selects a node forming the path, on the basis of a node-to-node transfer probability; and a probability resetting unit which, in the case where the selected node is a node that has already been passed through on the path, resets the transfer probability such that the selection of the node is suppressed.

(Supplementary note 15) The network system according to Supplementary note 14, including a probability resetting unit which, in the case where the selected node is a node that has already been passed through on the path, resets the transfer probability to the node to a value that is smaller compared to the transfer probability in the case where the node is not passed through.

(Supplementary note 16) The network system according to Supplementary note 14, including a selecting unit which generates a random number X within a range of not less than 0.0 and less than a total value of the transfer probabilities to select a next hop node probabilistically.

While the present invention has been described above with reference to the exemplary embodiment, the present invention is not restricted to the above-described exemplary embodiment. The configuration and details of the present invention may be subject to various modifications which are understandable by those skilled in the art within the scope of the present invention.

This application claims the priority of Japanese Patent Application No. 2010-061118 filed on Mar. 17, 2010, the entire disclosure of which is incorporated herein.

REFERENCE SIGNS LIST 1 communication network system
5 node
5-S source node
5-D destination node
5-$i$ target node
5-$j$ neighboring node
10 control server
100 next hop node determining unit
200 node setting unit
300 loop detecting unit
400 transfer probability table
500 path node list
NET communication network
REQ path setting request
CMD transfer table setting command

The invention claimed is:

1. A method, implemented by a processor, comprising:
determining a route for transferring an incoming packet in response to an inquiry sent from at least one of a plurality of nodes;

selecting a node forming the paths, on the basis of a node-to-node transfer probability which is defined for each combination of a destination node and a next hop node candidate; and resetting the node-to-node transfer probability of the selected node such that the selection of the selected node is suppressed, in the case where the selected node comprises a node that has already been passed through on the path, wherein the selecting of the node is performed on a node-to-node basis where a resetting of the node-to-node probability is capable of being performed before a loop occurrence, and wherein the node-to-node transfer probability comprises a probability of a packet being transferred to a neighboring node.

2. The method, implemented by a processor, according to claim 1, wherein in the case where the selected node comprises a node that has already been passed through on the path, the node-to-node transfer probability to the node is reset to a value that is smaller compared to the node-to-node transfer probability in the case where the node is not passed through.

3. The method, implemented by a processor, according to claim 1, wherein a random number X is generated within a range of not less than 0.0 and less than a total value of the node-to-node transfer probabilities to select a next hop node probabilistically.

4. An information processor controlling a network system having a plurality of paths from a source to a destination, the information processor comprising:

a next hop node determining unit implemented at least by a hardware including a processor and which selects a node forming the path, on the basis of a node-to-node transfer probability which is defined for each combination of a destination node and a next hop node candidate; and a loop detecting unit implemented at least by a hardware including a processor and which resets the node-to-node transfer probability of the selected node such that the selection of the node is suppressed, in the case where the selected node comprises a node that has already been passed through on the path, wherein the next hop node determining unit selecting of the node is performed on a node-to-node basis where the loop detecting unit resetting of the node-to-node probability is capable of being performed before a loop occurrence, and wherein node-to-node transfer probability comprises a probability of a packet being transferred to a neighboring node.

5. The information processor according to claim 4, wherein the loop detecting unit resets the node-to-node transfer probability to the node to a value that is smaller compared to the node-to-node transfer probability in the case where the node is not passed through, in the case where the selected node comprises a node that has already been passed through on the path.

6. The information processor according to claim 4, wherein the next hop node determining unit generates a random number X within a range of not less than 0.0 and less than a total value of the node-to-node transfer probabilities, to select a next hop node probabilistically.

7. A network system having a plurality of paths from a source to a destination, the network system including a control server configured to set a prescribed path from among the plurality of paths, the control server comprising:

a next hop node determining unit implemented at least by a hardware including a processor and which selects a node forming the path, on the basis of a node-to-node transfer probability which is defined for each combination of a destination node and a next hop node candidate; and a loop detecting unit implemented at least by a hardware including a processor and which resets the node-to-node transfer probability of the selected node such that the selection of the node is suppressed, in the case where the selected node comprises a node that has already been passed through on the path, wherein the next hop node determining unit selecting of the node is performed on a node-to-node basis where the loop detecting unit resetting of the node-to-node probability is capable of being performed before a loop occurrence, and wherein node-to-node transfer probability comprises a probability of a packet being transferred to a neighboring node.

8. The network system according to claim 7, wherein the loop detecting unit resets the node-to-node transfer probability to the node to a value that is smaller compared to the node-to-node transfer probability in the case where the node is not passed through, in the case where the selected node comprises a node that has already been passed through on the path.

9. The network system according to claim 7, wherein the next hop node determining unit generates a random number X within a range of not less than 0.0 and less than a total value of the node-to-node transfer probabilities, to select a next hop node probabilistically.

10. A non-transitory computer-readable recording medium storing a path selection program performed by a computer in a network system, the program causing the computer to execute:

determining a route for transferring an incoming packet in response to an inquiry sent from at least of a plurality of nodes;

selecting a node forming the paths on the basis of a node-to-node transfer probability which is defined for each combination of a destination node and a next hop node candidate; and resetting the node-to-node transfer probability of the selected node such that the selection of the node is suppressed, in the case where the selected node comprises a node that has already been passed through on the path, wherein the selecting of the node is performed on a node-to-node basis where a resetting of the node-to-node probability is capable of being performed before a loop occurrence, and wherein the node-to-node transfer probability comprises a probability of a packet being transferred to a neighboring node.

11. An apparatus, comprising:

a determining unit implemented at least by a hardware including a processor and which determines a route for transferring an incoming packet in response to an inquiry sent from at least one of a plurality of nodes;

wherein the determining unit comprising:

a next hop node determining unit implemented at least by a hardware including a processor and which selects a node forming the paths, on the basis of a node-to-node transfer probability which is defined for each combination of a destination node and a next hop node candidate;

a loop detecting unit implemented at least by a hardware including a processor and which resets the node-to-node transfer probability of the selected node such that the selection of the selected node is suppressed, in the case where the selected node comprises a node that has already been passed through on the path, wherein the next hop node determining unit selecting of the node is performed on a node-to-node basis where the loop detecting unit resetting of the node-to-node probability is capable of being performed before a loop occurrence, and wherein node-to-node transfer probability comprises a probability of a packet being transferred to a neighboring node.

12. A network system comprising:

an external controller to determine a route for transferring an incoming packet in response to an inquiry sent from at least one of a plurality of nodes;

wherein the external controller comprises a next hop node determining unit implemented at least by a hardware including a processor and which selects a node forming the paths, on the basis of a node-to-node transfer probability which is defined for each combination of a destination node and a next hop node candidate, and a loop detecting unit implemented at least by a hardware including a processor and which resets the node-to-node transfer probability of the selected node such that the selection of the node is suppressed, in the case where the selected node comprises a node that has already been passed through on the path, wherein the next hop node determining unit selecting of the node is performed on a node-to-node basis where the loop detecting unit resetting of the node-to-node probability is capable of being performed before a loop occurrence, and wherein node-to-node transfer probability comprises a probability of a packet being transferred to a neighboring node.

* * * * *